United States Patent [19]
Mitchell

[11] 3,733,658
[45] May 22, 1973

[54] UPHOLSTERY NAIL

[76] Inventor: David B. Mitchell, 2905 Walnut, Garland, Tex. 75040

[22] Filed: Nov. 13, 1970

[21] Appl. No.: 89,327

[52] U.S. Cl. ................................................24/152
[51] Int. Cl. ............................................A47b 19/01
[58] Field of Search......................24/90, 152, 150, 24/113, 114

[56] References Cited

UNITED STATES PATENTS

| | | | |
|---|---|---|---|
| 3,449,802 | 6/1969 | Mackey | 24/152 |
| 2,802,297 | 8/1957 | Meyer | 24/152 |
| 3,500,506 | 3/1970 | Mitchell | 24/113 |

Primary Examiner—Francis K. Zugel
Assistant Examiner—Garry Moore
Attorney—A. Yates Dowell and A. Yates Dowell, Jr.

[57] ABSTRACT

A decorative one-piece plastic fastener for securing layers of sheet material together. The fastener is a penetrating nail having a head with an embossed design on the center surface and a locking disk for holding the nail and upholstery material in assembled relation.

1 Claim, 8 Drawing Figures

PATENTED MAY 22 1973 3,733,658
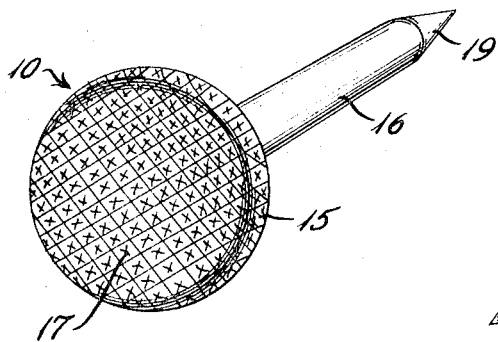
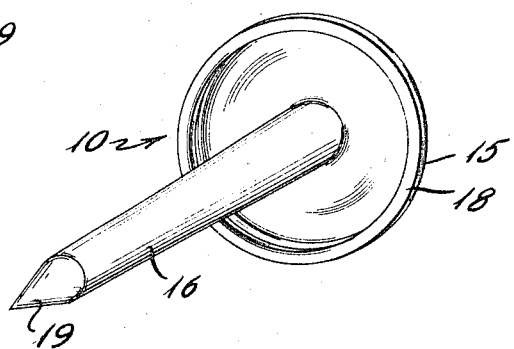
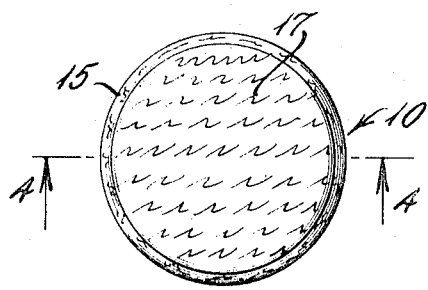
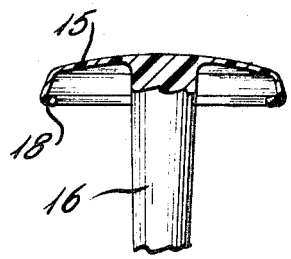
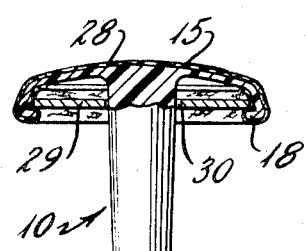
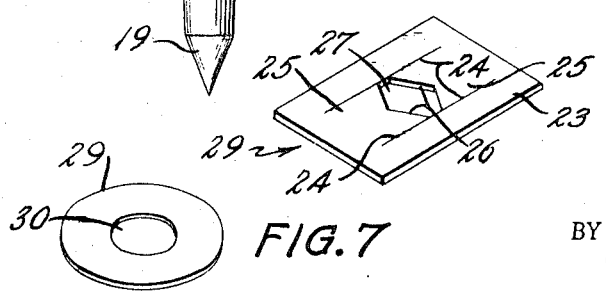
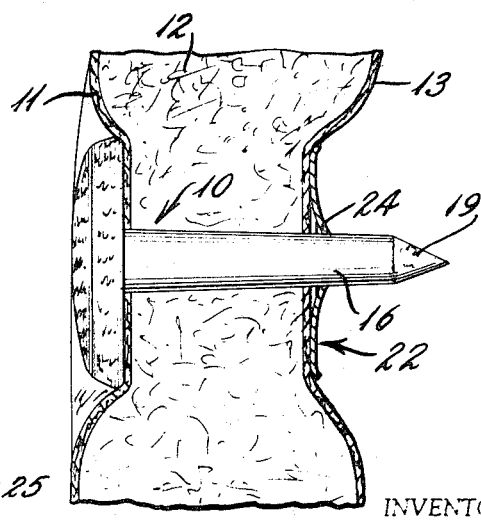
INVENTOR
DAVID B. MITCHELL 3,733,658

1

UPHOLSTERY NAIL

CROSS-REFERENCE TO RELATED APPLICATION

This application is an improvement over my prior upholstery button application filed Aug. 28, 1967 and now U.S. Pat. No. 3,500,506.

BACKGROUND OF THE INVENTION

1. Field of the Invention

This invention relates generally to decorative buttons and fasteners for securing layers of material together, and relates specifically to a one-piece plastic upholstery nail for securing an upholstery cover and a padding material to a backing material wherein the head of the upholstery nail is embossed to present a decorative appearance similar to the upholstery cover material and the nail may be secured in position by a spring-toothed locking member.

2. Description of the Prior Art

Many attempts have been made to construct a sturdy upholstery nail for connecting upholstery cover material and padding to a backing material; however, these prior art devices have been complicated, relatively expensive, have required fabrication of multiple parts involving substantial hand work, have required cover material to be applied to the head of the nail, and for other reasons have not been satisfactory.

SUMMARY OF THE INVENTION

The present invention is a one-piece molded fastener for holding layers of flexible material together. The fastener includes a unitary head and stem in which the head is embossed with a suitable design so that the fastener is ready for immediate use after molding. The stem is smooth with an unbroken surface and sharply pointed at one end so that it is easily inserted through upholstery material and has a minimal tendency to snag. After the fastener has penetrated the upholstery material, a locking disk is applied along the stem to lock the material and the nail in assembled relationship. If desired, a retainer disk may be used with the nail to hold fabric in position on the head of the nail.

It is an object of the invention to provide an upholstery nail of sturdy one-piece construction having a decorative head which may be exposed or may be quickly and easily covered. The nail is easily locked into position by a locking member which slides along the stem when moved in one direction but resists movement in the other direction.

It is a further object of the invention to construct an inexpensive molded one-piece decorative nail which is simply constructed and is ready for use immediately after fabrication.

BRIEF DESCRIPTION OF THE DRAWINGS

FIG. 1 is a top perspective view of an upholstery nail made in accordance with this invention and having an embossed pattern on the head portion.

FIG. 2 is a bottom perspective thereof.

FIG. 3 is a top view of the head of the nail having an embossed pattern different from that shown in FIG. 1.

FIG. 4 is a section on the line 4—4 of FIG. 3.

FIG. 5 is a perspective view of a conventional locking member.

FIG. 6 is a view similar to FIG. 4 illustrating a modified form of the invention and showing a fabric cover over the head of the nail.

2

FIG. 7 is a perspective view of a flexible disk for locking sheet material to the head of the nail.

FIG. 8 shows the nail in use.

DESCRIPTION OF THE PREFERRED EMBODIMENTS

With continued reference to the drawing, the present invention includes an upholstery nail 10 for connecting a flexible upholstery cover 11 and a padding 12 to a backing material 13 to prevent shifting of the padding and the cover and to preserve the utility and aesthetic value of the upholstered furniture.

The upholstery nail 10 includes a relatively thin generally semi-spherical head 15 integrally molded to an elongated stem 16 so that it is ready for immediate use as soon as molded. Preferably the convex outer surface of the head 15 is provided with an embossed design 17 of any desired configuration and adapted to simulate leather, fabric, expanded vinyl, or other material used for the upholstery cover 11. The inner surface of the head 15 is generally concave and includes an inwardly extending annular flange or rib 18 along the lower extremity of the head for imparting strength to the head as well as for a purpose which will be described later. It is noted that the outer surface of the head may be of another desired configuration to enhance the embossed design or to increase the aesthetic appearance of the head.

As illustrated the stem 16 is slightly tapered throughout its length; however, if desired, such stem could be of generally cylindrical configuration. The end of the stem remote from the head is provided with a penetrating point 19. The stem 16 can be of any desired length, although a length of approximately one inch has been found satisfactory for most applications. Preferably the upholstery nail 10 is constructed of any desired moldable material such as nylon, the acrylics, polyethylene, or other polymer or copolymer, and may be colored any desired color to match or contrast with the color of the upholstery cover 11.

In order to mount the upholstery nail 10 on various thicknesses of upholstery, a lock member 22 is provided which frictionally engages the stem 16 of the nail. As illustrated, the lock member includes a body 23 constructed of spring metal or other relatively hard resilient material and provided with a pair of generally parallel slits 24 defining a pair of opposed tongues 25. As illustrated, the inner end of each of the tongues 25 is provided with a generally V-shaped notch 26 defining a central opening 27. The opposed notches are spaced closely enough together so that the edges of each notch will engage the periphery of the stem 16 so that when the lock member is applied to the stem the tongues 25 will flex outwardly from the plane of the body 23 and the V-shaped notches will frictionally engage and bite into the material of the stem. The lock member can be quickly applied to the stem merely by pushing such member lengthwise of the stem. However, the outward flexing of the tongues will prevent ready withdrawal of the upholstery nail.

As illustrated in FIGS. 6 and 7, the embossed outer surface of the head 15 can be covered with a flexible sheet material 28 which will match or contrast with the upholstery cover 11. The sheet material 28 can be applied to the outer surface of the head 15 in any desired manner, as by an adhesive or other bonding agent, or as illustrated, such sheet material may extend inwardly of the annular flange 18 and into the concave inner portion of the head 15. In this position a locking disk 29 of relatively hard flexible sheet material having a central opening 30 can be applied. The outer periphery of the disk 29 is slightly larger in diameter than the inner diameter of the flange 18 and the central opening 30 is larger in diameter than the diameter of the elongated stem 16. When the flexible sheet material 28 is in place, the locking disk 29 is moved axially of the stem 16 until the disk engages the sheet material and the annular flange 18. Thereafter continued upward movement of the disk will cause the head 15 to flex outwardly until the outer periphery of the disk passes the annular flange 18 at which time the head will spring inwardly and lock the sheet material 18 against the concave inner surface of the head 15.

In the operation of the device, after the padding 12 and the upholstery cover material 11 are placed on the backing material 13, the penetrating point 19 of the nail 10 is placed against the upholstery cover and an axial force is applied to the head 15 to cause the penetrating point 19 and the stem 16 to penetrate the cover, padding and backing material. When the penetrating point has passed through the backing material 13, the lock member 22 is applied over the stem 16 and a counter force is exerted on the lock member. As illustrated in FIG. 8, the force applied to the head 15 and the counter force applied to the lock member 22 will compact the material between the head and the lock member and cause both the head 15 and the lock member 22 to be recessed within the material. When the counter force is applied to the lock member, the tongues 26 will flex outwardly by contact between the stem 16 and the V-shaped notches 27 so that the notches will frictionally engage and bite into the material of the stem.

I claim:

1. The combination of an upholstery nail and a lock member for connecting flexible cover material and flexible padding material of indefinite thickness to a backing material, said nail comprising a unitary one-piece body molded of thermoplastic material, said body including an elongated frusto-conical stem having a constant taper, a head integrally molded to the end of the stem having the larger diameter and a penetrating portion at the other end, said penetrating portion being generally conical and terminating in a penetrating point, said head being of concavo-convex configuration in cross-section and defining a thin wall structure, the upper portion of said stem being disposed within said head, an annular flange extending radially inwardly from the edge of said head, the outer convex surface of said head having a design embossed thereon, said lock member including a substantially flat body constructed of spring metal, said lock body having a pair of opposed tongues located along the longitudinal axis of the same, said lock body having a central opening of a size less than the smaller diameter of said stem, whereby the stem of said nail penetrates the cover material, padding material and backing material and said lock member is forced onto said stem in a manner that said tongues bite into opposite sides of said stem, and opposite axial pressure applied to said head and said lock member causes the padding material to be compressed and the lock member holds the padding material in compressed condition.

* * * * *